US010715440B1

(12) United States Patent
Loganathan et al.

(10) Patent No.: US 10,715,440 B1
(45) Date of Patent: Jul. 14, 2020

(54) DISTRIBUTED NEXT HOP RESOLUTION

(71) Applicant: Juniper Networks, Inc., Sunnyvale, CA (US)

(72) Inventors: Jaihari V. Loganathan, Cupertino, CA (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 144 days.

(21) Appl. No.: 16/026,005

(22) Filed: Jul. 2, 2018

(51) Int. Cl.
*H04L 12/745* (2013.01)
*H04L 12/46* (2006.01)
*G01D 21/00* (2006.01)
*H04L 12/751* (2013.01)
*H04L 12/753* (2013.01)
*H04L 12/801* (2013.01)

(52) U.S. Cl.
CPC ............ *H04L 45/748* (2013.01); *H04L 45/48* (2013.01); *H04L 47/17* (2013.01)

(58) Field of Classification Search
CPC ........ H04L 45/748; H04L 47/17; H04L 45/48
See application file for complete search history.

(56) References Cited

U.S. PATENT DOCUMENTS

| | | | | |
|---|---|---|---|---|
| 2009/0046739 A1* | 2/2009 | Ebling | .................. | G01D 21/00 370/465 |
| 2011/0116366 A1* | 5/2011 | Smith | ..................... | H04L 45/02 370/225 |
| 2016/0182444 A1* | 6/2016 | Mao | .................... | H04L 12/4633 370/392 |

* cited by examiner

*Primary Examiner* — Kiet Tang
(74) *Attorney, Agent, or Firm* — John C. Pokotylo; Pokotylo Patent Services

(57) ABSTRACT

A system for resolving next hops in a distributed manner includes a plurality of next hop resolution subsystems, each of the plurality of next hop resolution subsystems including (1) a next hop registry, (2) a partial-view tree storing a local instance of next hop resolution information, and (3) a full-view tree storing a local instance of next hop resolution information. The system (1) receives a request to resolve a next hop; (2) obtains a plurality of partial results using the partial-view trees of the next hop resolution subsystems; (3) select a best one of the plurality of partial results; and 4) replies to the request using the selected best one of the plurality of partial results. The full-view trees are updated such that their contents tend to converge.

23 Claims, 12 Drawing Sheets

DISTRIBUTED NEXT HOP RESOLUTION

§ 1. BACKGROUND OF THE INVENTION

§ 1.1 Field of the Invention

The present description concerns communications networks. In particular, the present description concerns systems and methods for resolving next hop information that enables a data packet to reach its destination through a communications network.

§ 1.2 Background Information

The Internet is a large collection of host devices (e.g., personal computers, laptops, tablets, smart phones, etc.) that communicate with each other. Data is typically carried in fixed length cells called packets. Each packet may include, among other things, a source address, a destination address and a payload. Routers may be used as intermediate packet switches to forward a packet through one or more networks until the packet reaches a router that is attached to the same network as the destination host. A router may then deliver the packet to the specified destination host on its local network.

Routers keep track of so-called "next hop" information that enables a data packet to reach its destination through the network. More specifically, a router that does not have a direct physical connection to the destination checks its routing table (or its forwarding table) and forwards packets to another next-hop router that is closer to the ultimate destination of the packet. This process continues until the packet reaches its final destination.

The manner in which such next hop information is stored and/or accessed and used has various implications with respect to a router's performance. Next hop information may be stored in a route information base (RIB), for example. Example RIBs are introduced in § 1.2.1 below.

§ 1.2.1 Example Ribs and IP Routing Information Tables

A router decides how to forward a received packet based on the destination address of the received packet (or based on one or more labels found in information encapsulating a data packet) and information that is contained in its forwarding table (or forwarding information base (FIB)). The information in a router's FIB is derived from information in its routing table. Routers use network information distribution protocols to announce route information to, and receive route information from, other routers. They build tables of routes based on the collected information about all the best paths to all the destinations they know how to reach.

In a router, each configured protocol has one or more local routing tables, sometimes referred to as a routing information base (RIB). This table is a database local to the protocol that contains all the routes known by that protocol to prefixes (that is, at least a part of an Internet protocol address) in the table. For example, the open shortest path first (OSPF) protocol might have four different routes to the destination address 10.23.40.5.32, but only one of these four routes is the "best" (in terms of some cost function) route to that prefix known to OSPF. Nonetheless, all four routes may be stored in the OSPF protocol's local routing table. The router may maintain a global routing table database, which contains (e.g., at most) one route per protocol to each prefix in the table. Each of these routes is the "best" route known by a given protocol to get to that prefix. For example, the global routing table does not have two OSPF routes to the prefix 10.5.11.0/24. Rather, it will have only one (if any) OSPF route to that prefix. The router might also have a Border Gateway Protocol (BGP) route to the prefix, and/or a Routing Information Protocol (RIP) route to the same prefix, etc. However, the global routing table will have no more than one route to a given prefix, for a given protocol.

The Internet Protocol (IP) may compare the costs (e.g., administrative distances) for the routes to each prefix, and select the overall best route regardless of protocol. For example, the best route to the prefix 10.5.11.0/24 might be via the Intermediate System-Intermediate System (IS-IS) protocol, while the best route to the prefix 192.168.0.0/16 might be via BGP, and so on.

Note that a "protocol next hop" is the network layer address of the remote routing device that advertised the prefix. This address is used to recursively derive a "forwarding next hop" That is, "forwarding next hops" are on the local links of a router, while the protocol next hop is the address of the router or device that advertised the route.

§ 1.2.2 Example Forwarding Information Tables

These selected overall best routes to each prefix may be used to create a forwarding table. Local instances of the forwarding table (for example, stored at line modules of the router) may be used to forward packets received by the particular line module. When the global routing table is updated, such updates should be pushed to the instances of the forwarding tables.

§ 1.2.3 Example Illustrating the Use of Next Hop Information in Forwarding Tables FIG. 1 illustrates a very simple network 100 composed of three networks (10.1.0.0/16, 10.5.0.0/30 and 10.2.0.0/16) and two routers 110a and 110b. Hosts attached to each network are not shown (because each router makes its forwarding decisions based on the network number and not on the address of each individual host). Each router 110 may use the Address Resolution Protocol (ARP) to find the physical (e.g., media access control (MAC)) address that corresponds to the Internet protocol (IP) address for any host or router on networks directly connected to it.

Table 1 and Table 2 represent information from the routing tables for routers 110a and 110b, respectively. Each routing table contains one entry for each route for each protocol or route type. In this example, each routing table entry (row) includes: (1) the destination IP network address; (2) the IP address of the next-hop router; (3) the type of network, such as static, directly connected, or the particular protocol; (4) an administrative distance that is used to select the least-cost route among multiple routes to the same destination network (Note that the least-cost (best) route is placed in the forwarding table. The administrative distance is not included in the forwarding table.); and (5) a metric that is used by protocols to which the route is redistributed to select the least-cost route among multiple routes to the same destination network. (Note that the metric is not used to determine the best route to be placed in the forwarding table. The metric is also not listed in the forwarding table.)

TABLE 1

Routing Table for Router 110a

| Destination Network | Next-Hop Router | Route Type | Administrative Distance | Metric |
|---|---|---|---|---|
| 10.1.0.0/16 | 10.1.0.1 | connected | 0 | 0 |
| 10.2.0.0/16 | 10.5.0.3 | OSPF | 110 | 10 |
| 10.2.0.0/16 | 10.5.0.3 | IS-IS | 115 | 10 |
| 10.2.0.0/16 | 10.5.0.3 | EBGP | 20 | 15 |

TABLE 1-continued

Routing Table for Router 110a

| Destination Network | Next-Hop Router | Route Type | Administrative Distance | Metric |
|---|---|---|---|---|
| 10.2.0.0/16 | 10.5.0.3 | RIP | 120 | 5 |
| 10.5.0.0/30 | 10.5.0.2 | connected | 0 | 0 |

TABLE 2

Routing Table for Router 110b

| Destination Network | Next-Hop Router | Route Type | Administrative Distance | Metric |
|---|---|---|---|---|
| 10.1.0.0/16 | 10.5.0.2 | static | 1 | 0 |
| 10.1.0.0/16 | 10.5.0.2 | OSPF | 110 | 10 |
| 10.1.0.0/16 | 10.5.0.2 | RIP | 120 | 4 |
| 10.2.0.0/16 | 10.2.0.1 | connected | 0 | 0 |
| 10.5.0.0/30 | 10.5.0.3 | connected | 0 | 0 |

§ 1.2.4 Route Resolution Using Longest Match

Route resolution is a procedure that involves evaluating a next hop of a route. This involves finding a longest matching next hop in a routing table. The routing table is usually organized as a radix tree (e.g., a Practical Algorithm to Retrieve Information Coded in Alphanumeric (Patricia) tree) to facilitate finding the longest match. Finding the longest match requires a full-view (also referred to as a "global view" or "complete view") of the routing table. Unfortunately, providing a full-view routing table has scaling implications. In cases where the routing table is split into multiple tables (e.g., for concurrency reasons), this presents a problem.

One solution is to build a full-view table. However, this solution disadvantageously involves the overhead in building such a table, and imposes some limitations in terms of processes using the full-view table. Another current proposal is to build a minimal resolution tree in a single thread, with prefixes fed from sub-trees or partial trees in other threads. This solution is disadvantageous because of the potential for large amount of information exchange between threads.

Therefore, it would be useful to split routing table information in a way that permits a longest best match to be found, and which avoids the disadvantages of the foregoing proposed solutions (i.e., eliminates the need for a full-view table and reduces or eliminates the associated overhead).

§ 2. SUMMARY OF THE INVENTION

The present inventors had the insight that a radix (e.g., Patricia) tree best match can be realized as two-step process within a thread of execution. In the first step, a best match is found in a thread's partial-view sub-tree (resolve-partial). In the second step, an overall best match is found in a full-view tree populated with only results from the first step (resolve-complete or resolve-full).

One example computer-implemented method consistent with the present description is used in a system including a plurality of next hop resolution subsystems, each of the plurality of next hop resolution subsystems including (1) a next hop registry, (2) a partial-view tree storing a local instance of next hop resolution information, and (3) a full-view tree storing a local instance of next hop resolution information. An instance of the example computer-implemented method may be run, asynchronously, on each of the next hop resolution subsystems. An example method being performed on one of the plurality of subsystems may perform the following acts. The example method receives a request to resolve a next hop. Responsive to receiving the request, the example method determines, using the next hop registry of the one subsystem, whether or not resolution of the next hop was previously tried based on the subsystem's next hop registry (which will receive asynchronous updates from the other subsystems). Responsive to a determination that resolution of the next hop was previously tried, the example method being performed by the subsystem (1) processes the next hop request using the full-view tree of the subsystem to obtain a result including zero (i.e., unresolved or not reachable) or one (i.e., resolved, reachable) best match (which, as will be described in more detail later, may include a next hop address, but more generally, may include zero or more next hops), and (2) replies to the request using the result. Otherwise, responsive to a determination that resolution of the next hop was not previously tried, the example method being performed by the subsystem (1) processes the next hop request using its (local) partial-view tree to obtain a result including zero or one best match next hop address, (2) updates its (local) full-view tree to include the result obtained, (3) replies to the request using the result, (4) publishes the next hop resolution request to the other subsystems and (5) publishes the result as an update to the other subsystems.

In some example methods, the subsystem may, responsive to a determination that resolution of the next hop was not previously tried, further update its next hop registry (to indicate that resolution of the next hop was previously tried).

In at least some example methods, the subsystem might receive an update result from another one of the subsystems. Responsive to receiving the update result, the subsystem updates its local full-view tree using the update result, whereby contents of each of the plurality full-view trees converge towards the same state. The subsystem may also update its the next hop registry to indicate that a next hop associated with the update result was previously tried.

In at least some example methods, each of the partial-view trees of the plurality of next hop resolution subsystems stores mutually exclusive next hop resolution information.

In at least some example methods, when a subsystem receives an update to its routing information causing a change to the information in a local partial view tree of a corresponding registered next hop, the subsystem will only publish the update to the other subsystems if the update caused a local change (and if the other subsystem was not the source of the update). That is, when routes in local partial view tree change (e.g., due to learning of a positive or negative route advertisement), the changed routes might (or might not) affect the reachability of next hops that are being resolved (or are "known"). Any change in such reachability of known next hops from the point of view of local view (local best matches) will be published to other subsystems so that the other subsystems can also re-converge.

Apparatus (e.g., routers, network equipment, route servers, etc.) may be configured to perform the foregoing example methods, and store the foregoing data structures (e.g., registries, partial-view trees and full-view trees).

A non-transitory computer-readable medium may store processor executable instructions which, when executed by one or more processors, implement the foregoing example methods.

§ 3. BRIEF DESCRIPTION OF THE DRAWINGS

§ 4. DETAILED DESCRIPTION

The present disclosure may involve novel methods, apparatus, message formats, and/or data structures for resolving a next hop in a distributed manner. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

The present disclosure is derived from the inventors' insight that the longest match of a next hop on a tree can be derived by a longest match on results of longest matches performed on sub-trees. For example, suppose a routing table RIB-a is divided into partial-view routing tables RIB-a1, RIB-a2, RIB-a3, and RIB-a4. A next hop "n" can be concurrently looked up on RIB-a1, RIB-a2, RIB-a3, and RIB-a4 producing local (or partial-view) longest matches m1, m2, m3 and m4 respectively. The global longest match for next hop "n" can then be derived by performing a longest match in a (full-view, or complete view) tree populated by m1, m2, m3, and m4. Note that the global longest match may be performed concurrently because each of the full view databases are available independently.

In the following, example systems consistent with the present description are described in § 4.1. Then, example methods consistent with the present description are described in § 4.2. An operational example of an example system and method consistent with the present description is then set forth in § 4.3. Alternatives, refinements, and/or extensions to the example systems and methods are then described in § 4.4. Finally, some conclusions about the present description are provided in § 4.5.

§ 4.1 Example Systems

Figure 1:
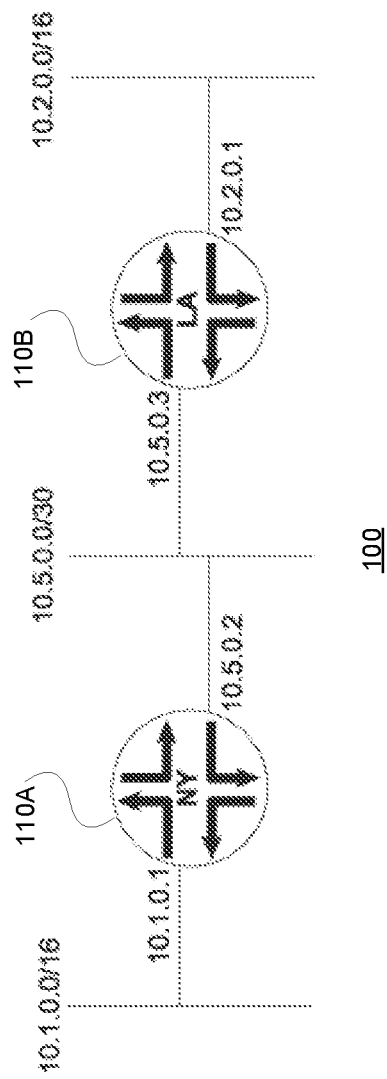
FIG. 1 illustrates a very simple network used to explain the use of routing information.
Figure 2:
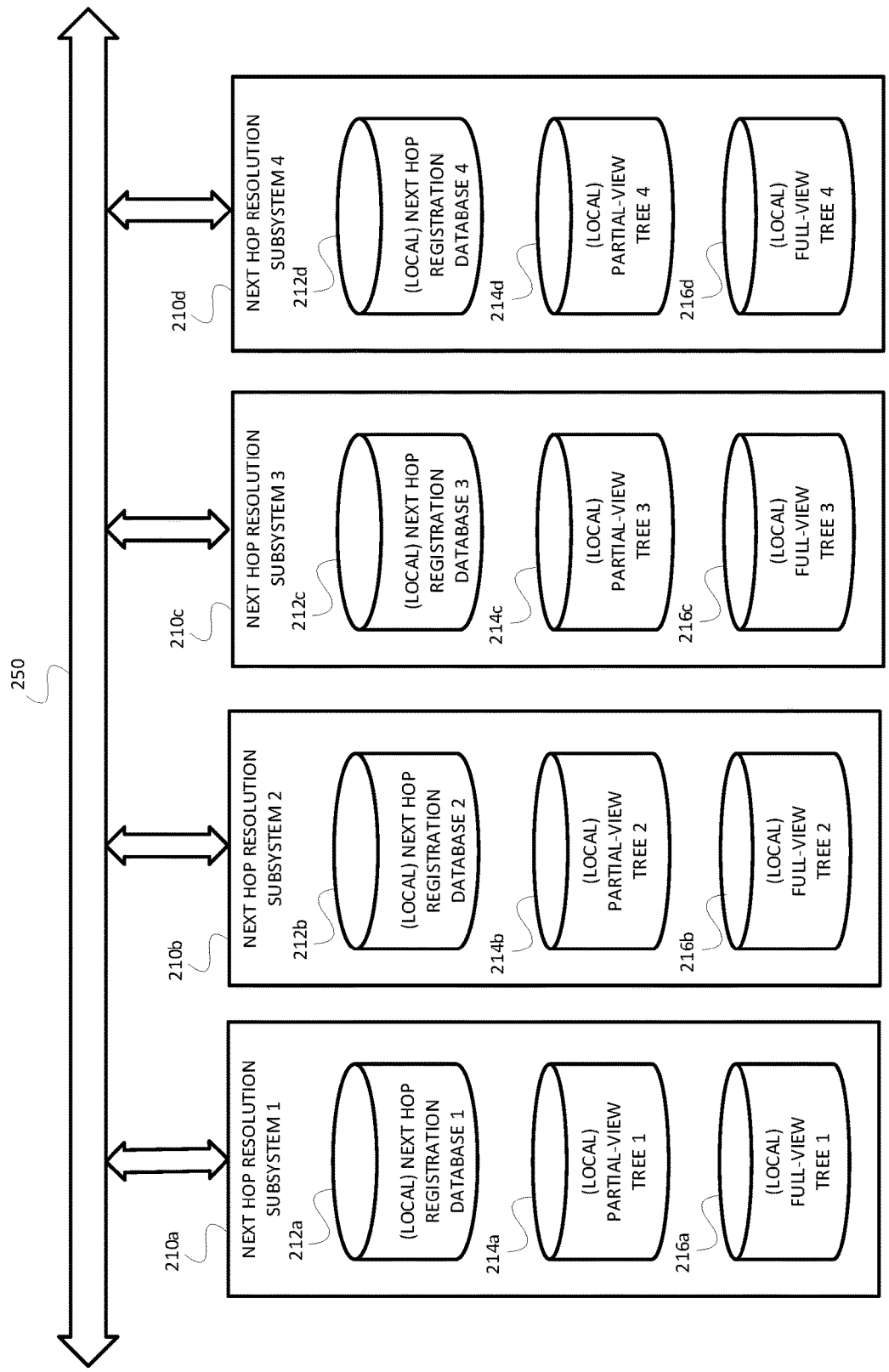
FIG. 2 is an example system for resolving a next hop in a distributed manner consistent with the present description.

Referring to FIG. 2, in an example system 200 consistent with the present description, each of a plurality of subsystems 210a-210d (also referred to as shards) implements next hop resolution functionality. Each of the plurality of next hop resolution subsystems 210a-210d includes (1) a next hop registry (e.g., registration databases) 212a-212d, (2) a partial-view tree 214a-214d storing a local instance of next hop resolution information, and (3) a full-view tree (216a-216d) storing a local instance of next hop resolution information. Thus, each of the partial-view trees 214a-214d is populated by local, partial-view routes (Each of the partial-view trees of the plurality of next hop resolution subsystems stores mutually exclusive next hop resolution information, and collectively store the full-view.), and each of the full-view trees 216a-216d is populated (eventually, so that the contents of each of the full-view trees 216a-216d converge) by best matches of each protocol next hop from each subsystem. The subsystems 210a-210d (e.g., partial-rib threads) communicate with one another via a bus (e.g., an internal network, also referred to as a "multi-thread bus") 250. Thus, each subsystem (shard) 210a-210d maintains a local, partial-view tree, the contents of which are based on routes locally in the shard.

§ 4.2 Example Methods

Figure 3:
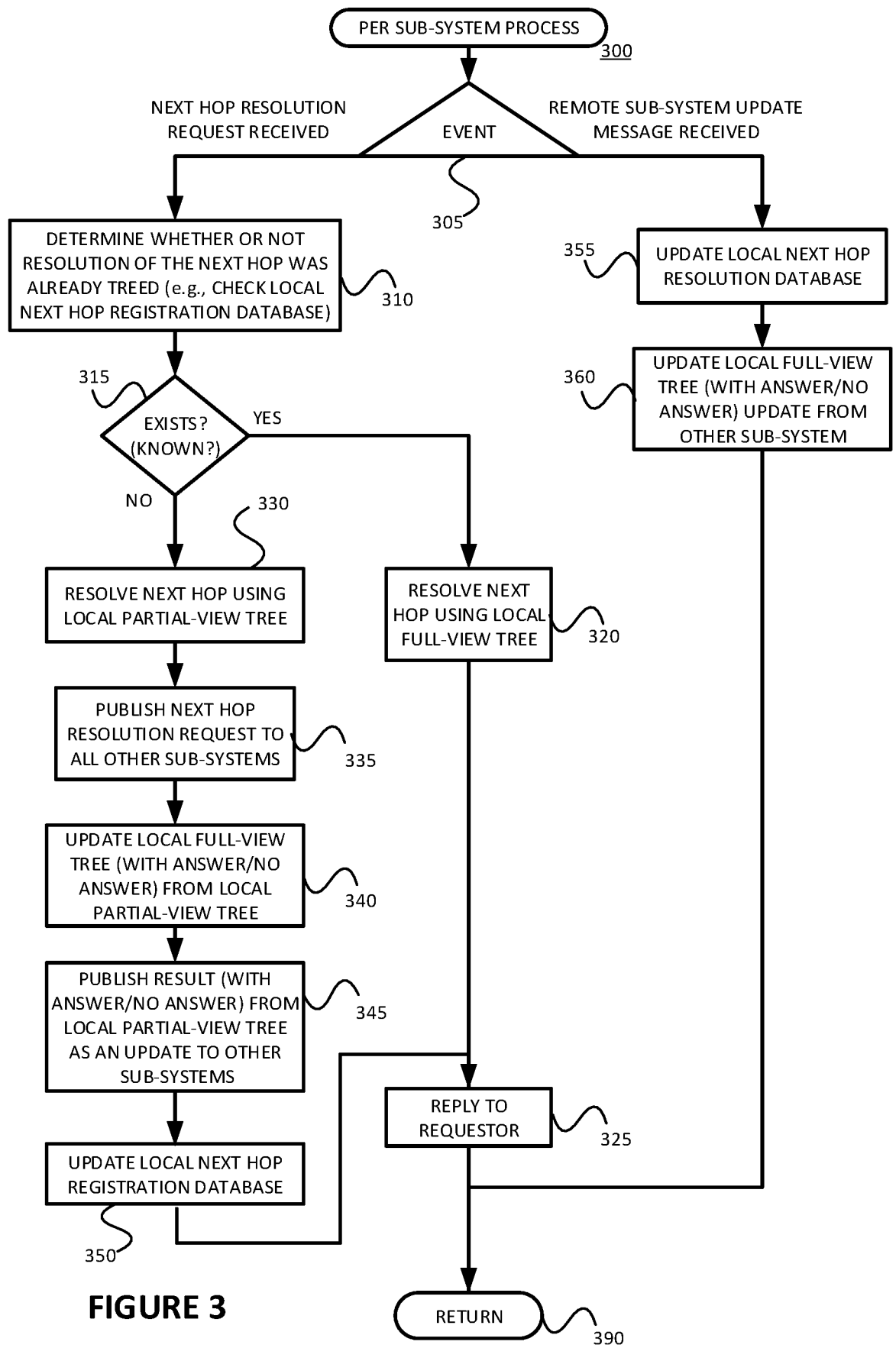
FIG. 3 is a flow diagram of an example method for resolving a next hop in a distributed manner consistent with the present description.

FIG. 3 is a flow diagram of an example method 300 for resolving a next hop in a distributed manner (e.g., using an example system such as that 200 of FIG. 2). Different branches of the example method 300 are performed in response to different events 305. More specifically, if a next hop resolution request is received, the example method 300 may determine whether or not the resolution of the next hop was already tried using its local next hop registration database 212a-212d (which will receive asynchronous updates from the other subsystems). (Block 310) If it is determined that the resolution of the next hop was not already tried (by any of the subsystems 210a-210d), the subsystem implementing the example method 300 processes (in an attempt to resolve) the next hop request using its partial-view tree to obtain a result including zero (i.e., unresolved/not reachable) or one (i.e., resolved/reachable) best match next hop address (Block 330), publishes the next hop resolution request to the other subsystems (Block 335), updates its full-view tree of the one subsystem to include the result obtained (Block 340), and publishes the result as an update to the other subsystems (Block 345). The subsystem may also reply to the request using the result (Block 325) before the example method 300 is left (Node 390). However, as described later, there may be one or more conditions to be met before the subsystem replies to the request.

Referring back to condition 315, responsive to a determination that resolution of the next hop was previously tried (e.g., by any of the subsystems), the subsystem implementing the example method 300 may (1) process the next hop request (to try to resolve it) using its full-view tree to obtain a result including zero (i.e., unresolved/unreachable) or one (i.e., resolved/reachable) best match next hop address (Block 345), and then reply to the request using the result (Block 325) before the example method is left (Node 390).

Referring back to the NO branch of condition 315, responsive to a determination that resolution of the next hop was not previously tried, the subsystem implementing the example method 300 may further update its next hop registry (Recall, e.g., 212a-212d) to indicate that the next hop was previously tried. In this way, the subsystem's next hop registry can be used to determine whether or not the resolution of the next hop was already tried. (Recall, e.g., block 310.)

Referring back to event 305, responsive to receiving an update result from another one of the subsystems, the subsystem implementing the example method 300 may update its next hop registry (Recall, e.g., 212a-212d of FIG. 2.) to indicate that a next hop associated with the update result was previously tried (Block 350), and update its full-view tree (Recall, e.g., 216a-216d of FIG. 2.) using the update result (Block 355). In this way, contents of each of the plurality full-view trees tend to converge towards the same state.

Referring back to blocks 345 and 325, the subsystem 210 performing the example method 300 might (A) reply to the requestor immediately, (B) reply to the requestor after waiting a period of time (e.g., to allow the other subsystems to process the request and update the subsystem processing the request), (C) reply to the requestor only after receiving updates from (e.g., all of) the other subsystems, etc.

Referring back to block 335, the method 300 may use some "dampening" of the response (e.g., by delaying or otherwise limiting the publication in block 335) since some routes may change (e.g., change back and forth, commonly referred to as "flap") at a high rate.

As should be appreciated from the foregoing, when a subsystem learns of a protocol next hop locally that needs to be resolved, if it has already considered the particular next hop, it can simply use its local full-view tree. (Recall, e.g., 315 YES, block 320 and block 325.) If, on the other hand, the request is for a new protocol next hop, a local resolution is initiated using the subsystem's local partial-view tree (Recall, e.g., 315 NO, and block 330) The local partial-view best-match result populates the subsystem's local full tree (Block 340). In addition the protocol next hop resolution request is published on the bus to all other subsystems (shards). (Recall, e.g., block 335.) When the other subsystems respond with their best matching results (right branch of Event 305), the subsystem updates its local full-view tree (Block 365) This may also trigger re-resolution of protocol next hop.

Thus, each subsystem that requires a protocol next hop to be resolved, publishes it to all other subsystems. (Recall, e.g., block 335.) In addition, the subsystem also invokes a partial resolution based on local sharded routes on its local partial-view tree. (Recall, e.g., block 330.)

As should be appreciated from the foregoing, if a subsystem has not previously processed the request for resolution of a protocol next hop (No branch of 315), each subsystem responds to such a request with the best match it has using its local partial-view tree. Each subsystem also registers this protocol next hop to its local resolver (Recall, e.g., blocks 350 and 355.) for tracking future reachability changes.

Although not shown in the Figure, when routes in local partial view tree change (e.g., due to learning of a positive or negative route advertisement), the changed routes might (or might not) affect the reachability of next hops that are being resolved (or are "known"). Any change in such reachability of known next hops from the point of view of local view (local best matches) will be published to other subsystems so that the other subsystems can also re converge.

Each subsystem maintains a local full-view resolution tree, which is populated by best matches of each protocol next hop from all the subsystems, including the local subsystem.

§ 4.3 Operational Example

Figure 4A:
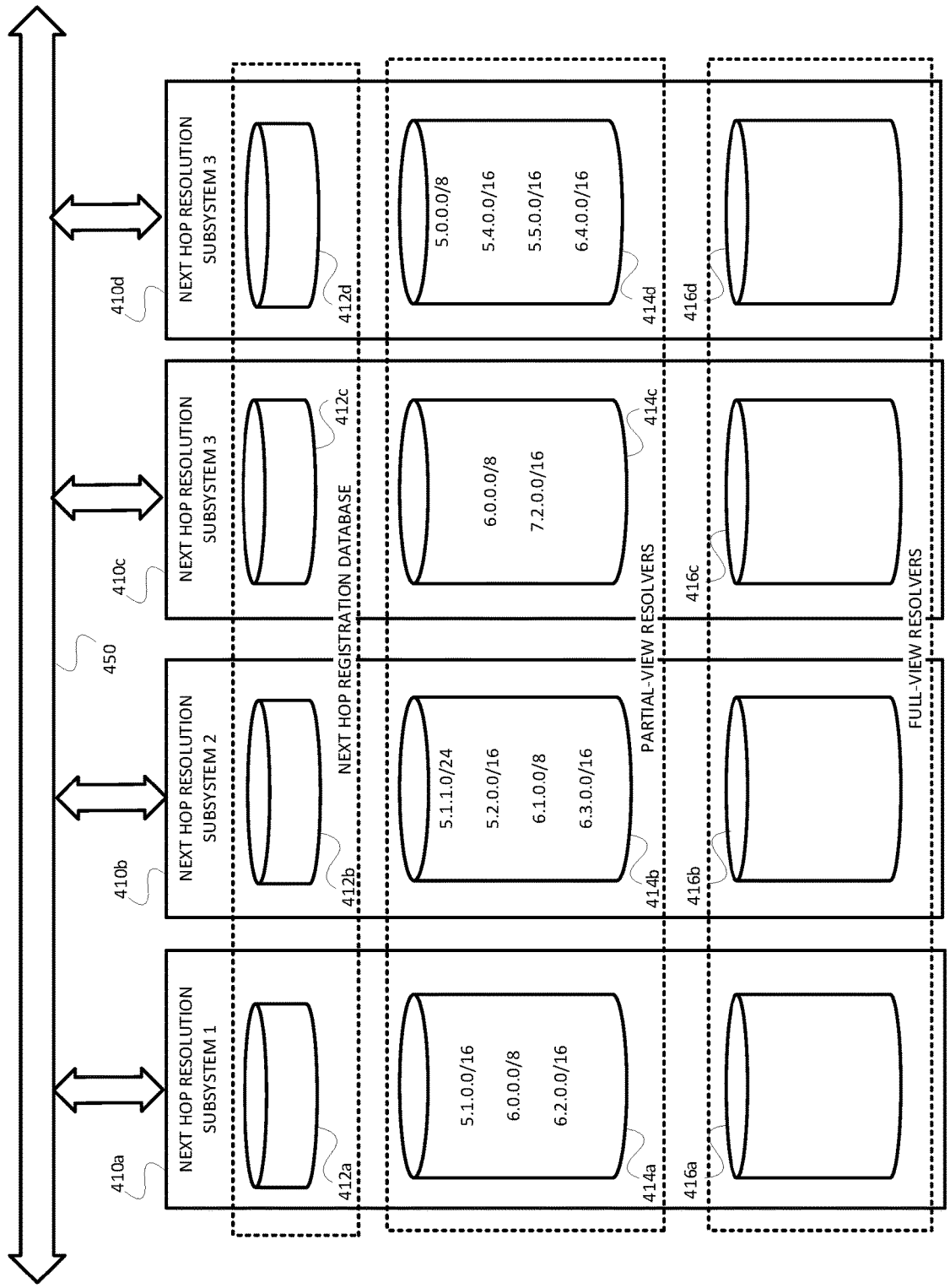
FIGS. 4A-4C illustrate an operational example of the example system and method illustrated in FIGS. 2 and 3.
Figure 4B:
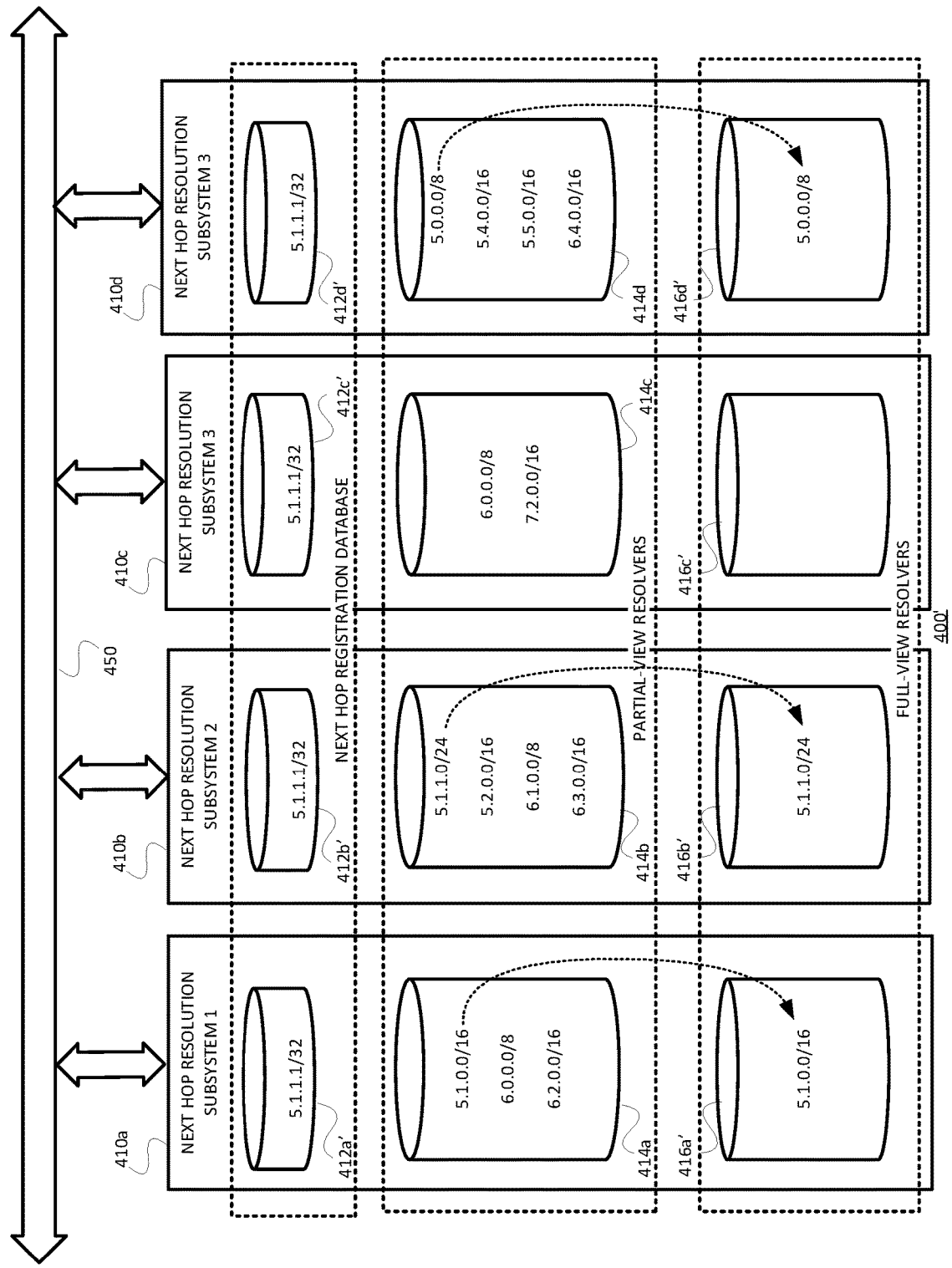
Figure 4C:
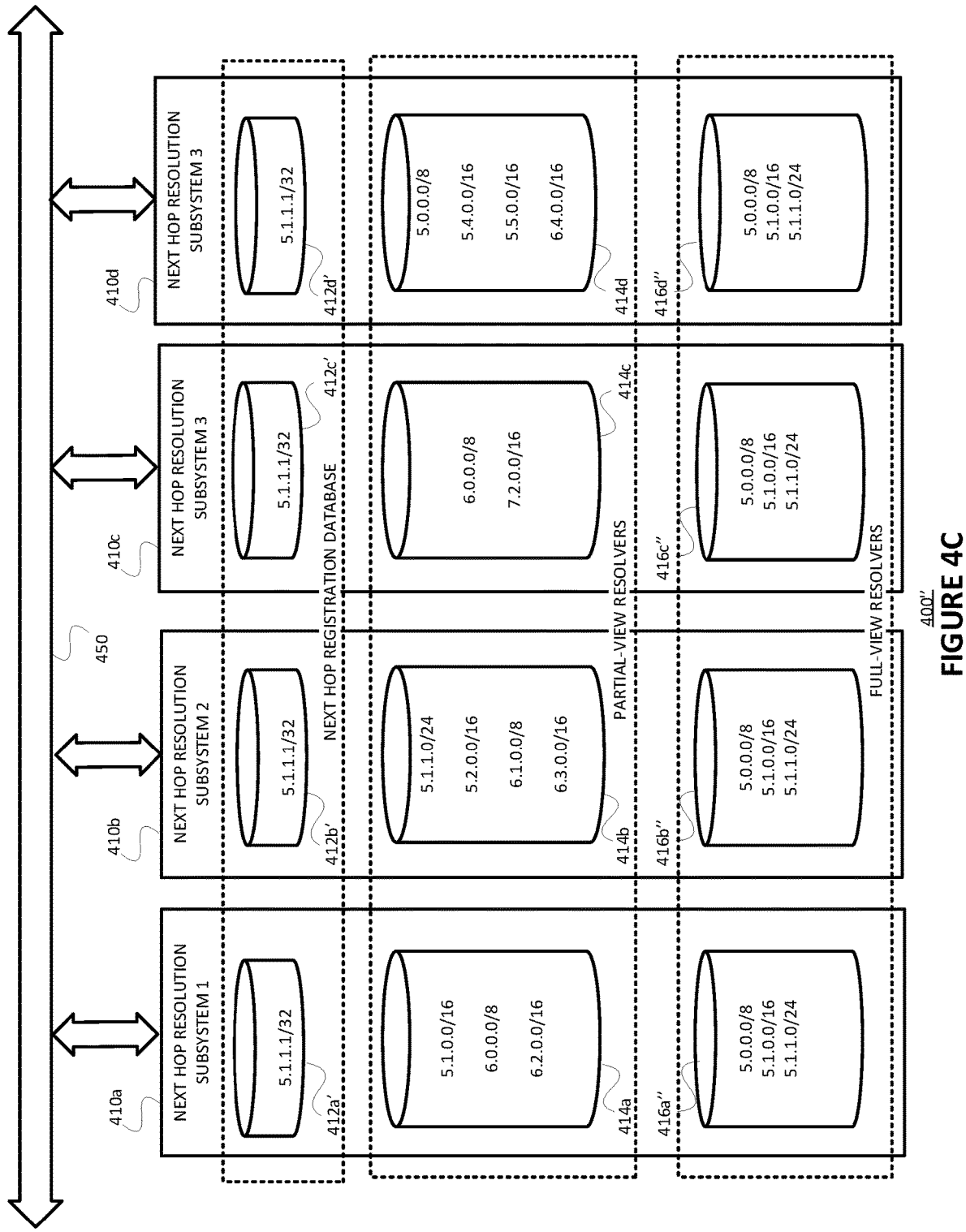

FIGS. 4A-4C illustrate an operational example of the example system and method illustrated in FIGS. 2 and 3. Referring first to FIG. 4A, consider subsystems 1-4 (410a-410d). These subsystems can represent four (4) partial-view trees 414a-414d (e.g., shards with sharded RIBs) populated as shown and connected by an inter-thread bus 450. For purposes of discussion, assume there are no indirect next hops yet, so the full-view trees 416a-416d are empty. Also assume that subsystems 410a-410d have not yet attempted to resolve any next hops, so the registries 412a-412d are also empty.

Still referring to FIG. 4A, suppose subsystem 1 410a learns of a route 100.0.0.0/8 with protocol next hop 5.1.1.1/32. Subsystem 1 410a checks its registry 412a and determines that it has not previously tried to resolve this next hop. (Recall block 310 and condition 315 NO of FIG. 3.) Therefore, subsystem 1 410a performs local lookup on its partial-view tree 414a (Recall block 330 of FIG. 3.) and publishes the request to the other subsystems 410b-410d (Recall block 335 of FIG. 3.).

Referring to FIG. 4B, each of the other subsystems 410b-410b (and recall subsystem 1 410a) uses its local partial-view tree 414a-414d to find its local (partial-view) best match (Recall block 330 of FIG. 3.), updates its local full-view tree 416a'-416d' (Recall block 340) and updates its registry 412a'-412d' (Recall block 350.). Each subsystem 410a-410d puts it local, partial-view, best match result on the bus 450. Note that since subsystem 3 410c was not able to resolve the next hop, it did not (yet) update its local full-view tree 416c'.

Finally, referring to FIG. 4C, each subsystem 410a-410d then saves the responses from the bus on their corresponding full-view trees 416a"-416d". Note that the contents of the local full-view trees 416a"-416d" of each of the subsystems 410a-410d might be different at any given time (See, e.g., FIG. 4B.), but will tend to converge to the same state (See, e.g., FIG. 4C.). In this way, in the future, each of the subsystems 410a-410d will have the same resolution state for 100.1.1.0/24→5.1.1.1/32→5.1.1.0/24.

Suppose one of the subsystems 410a-410d now learns another route 200.1.1.0/24 with the protocol next hop 5.1.1.1/32. Since this protocol next hop has already been resolved (See the registries 412a'-412d', no messages need to be exchanged on the bus. Instead, any one of the subsystems can resolve the next hop using its local full-view tree 416a"-416d".

§ 4.4. Alternatives, Refinements and Extensions

§ 4.4.1 Updates

Suppose a route in a partial-view tree is updated, and this update results in change of a protocol next hop. This, in turn, causes an update of the subsystem's local full-view tree and causes the subsystem to send a next hop resolve change on the bus so that other subsystems may update their local full-view trees.

§ 4.4.2 Local Next Hop Registry

In some example implementations consistent with the present description, the local registration information is overlaid on the local full-view database (e.g., tree).

§ 4.4.3 Use in Recursive Next Hop Determination

Although the foregoing examples discussed resolving next hop in a single pass, example embodiments consistent with the present description may be used in the context of recursive next hop determination, in which multiple passes are used to resolve a next hop. Consider, for example, a next hop 5.1.1.1/32 to be resolved. Assume that this results in the following best match:

5.1.1.0/24→10.1.1.1/32, 11.1.1.1/32 where 10.1.1.1/32 and 11.1.1.1/32 themselves are next hops that may be resolving over other routes. For example, assume that 10.1.1.1/32 resolves over 10.1.1.0/24→6.1.1.1 32 and that 11.1.1.1/32 resolves over 11.1.0.0/16→7.1.1.1./32. Note that there are plurality of gateways 10.1.1.1/32, 11.1.1.1/32. As is understood by those skilled in the art, multiple gateways can be used for load balancing, such as in Equal Cost Multi-Path (ECMP). Recursive next hop is also sometimes used to isolate route information for purposes of simplifying updates.

§ 4.4.4 Use in Other Longest Match Contexts

Although the foregoing examples were described in the context of IP version 4 (IPv4) addresses (32 bit max address length), example embodiments consistent with the present description can be used with IP version 6 (IPv6) addresses, and other sorts of network addresses involving best match. Indeed, example embodiments consistent with the present description can be used in the context of any longest match lookup (e.g., radix tree or Patricia tree lookup) in which the full view data structure being searched can be partitioned into (e.g., mutually exclusive) partial view data structures.

§ 4.4.5 Example Forwarding Systems (e.g., Routers)

Figure 5:
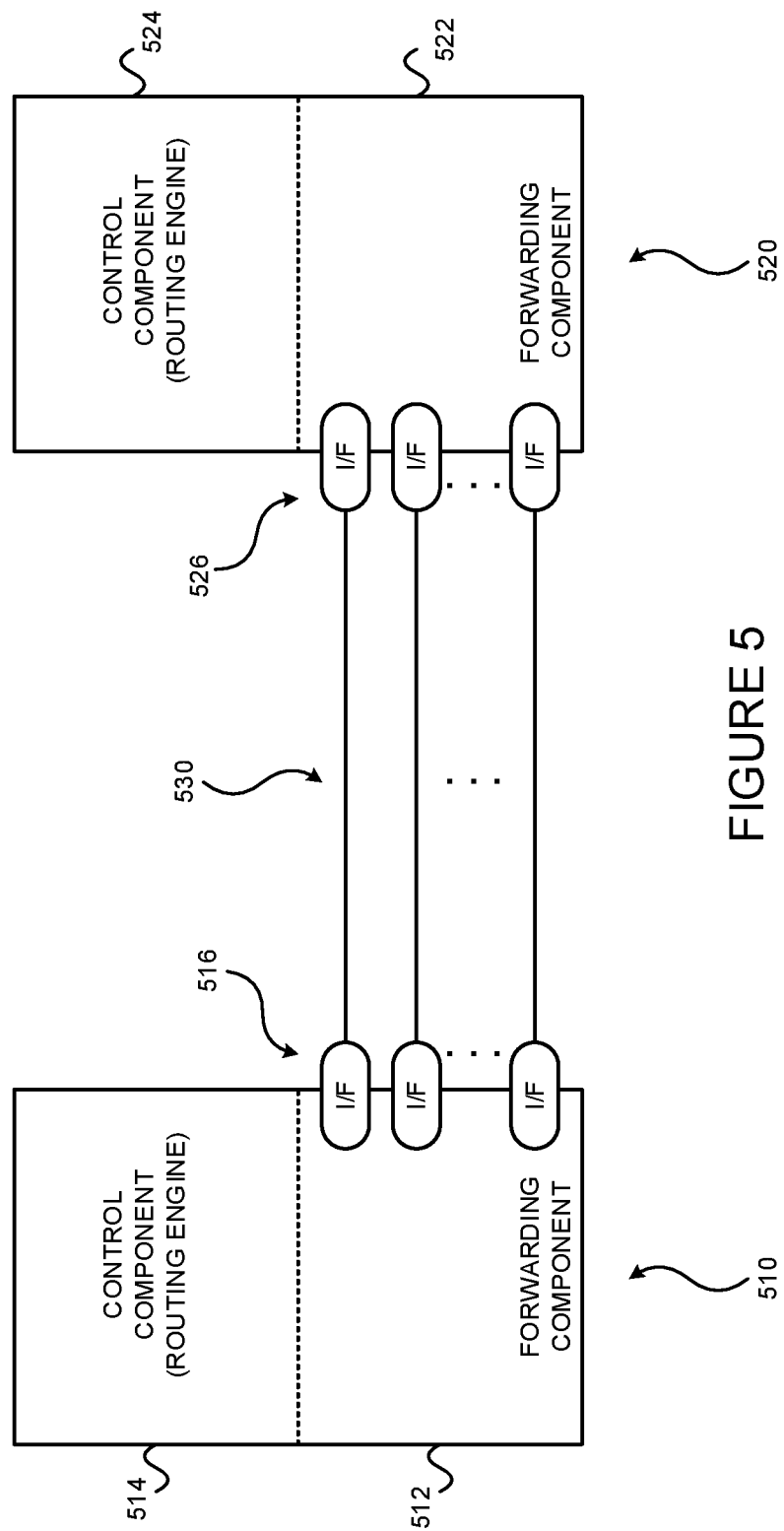
FIG. 5 illustrates an example environment including two systems coupled via communications links.

FIG. 5 illustrates two data forwarding systems 510 and 520 coupled via communications links 530. The links may be physical links or "wireless" links. The data forwarding systems 510,520 may be nodes, such as routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530. The example method 300 described above may be implemented in the control component 514 or 524 of device 510 or 520.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635, and the label-based forwarding protocol process(es) 640 may support protocols such as BGP 635, the label distribution protocol ("LDP") 636 and the resource reservation protocol ("RSVP") 637. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692, interface process(es) 693, distributed ASICs 694, chassis process(es) 695 and forwarding (e.g., route-based and/or label-based) table(s) 696.

Figure 6:
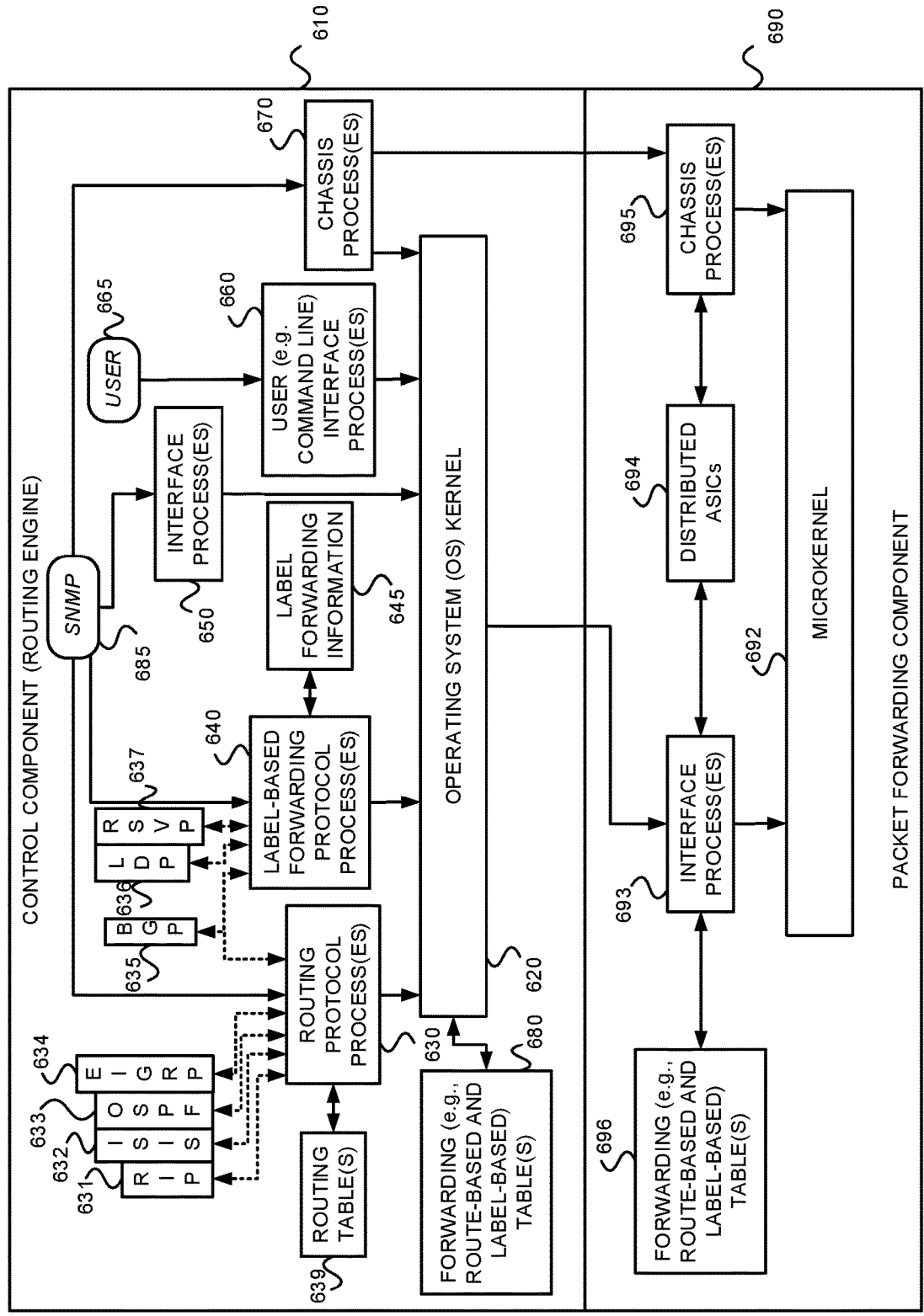
FIG. 6 is a block diagram of an example router on which the example methods of the present description may be implemented.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 636 and RSVP 637 (and BGP 635) protocols are provided. Naturally, other label-based forwarding protocols (e.g., MPLS) may be provided in addition, or alternatively. In the example router 600, the routing table(s) 639 is produced by the routing protocol process(es)

630, while the label forwarding information 645 is produced by the label-based forwarding protocol process(es) 640.

Still referring to FIG. 6, the interface process(es) 650 performs configuration of the physical interfaces (Recall, e.g., 516 and 526 of FIG. 5.) and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

In the example router 600, the example method 300 consistent with the present disclosure may be implemented in the control component 610, and more specifically, in the routing protocol process(es) 630 and the routing tables 639.

Figure 7:
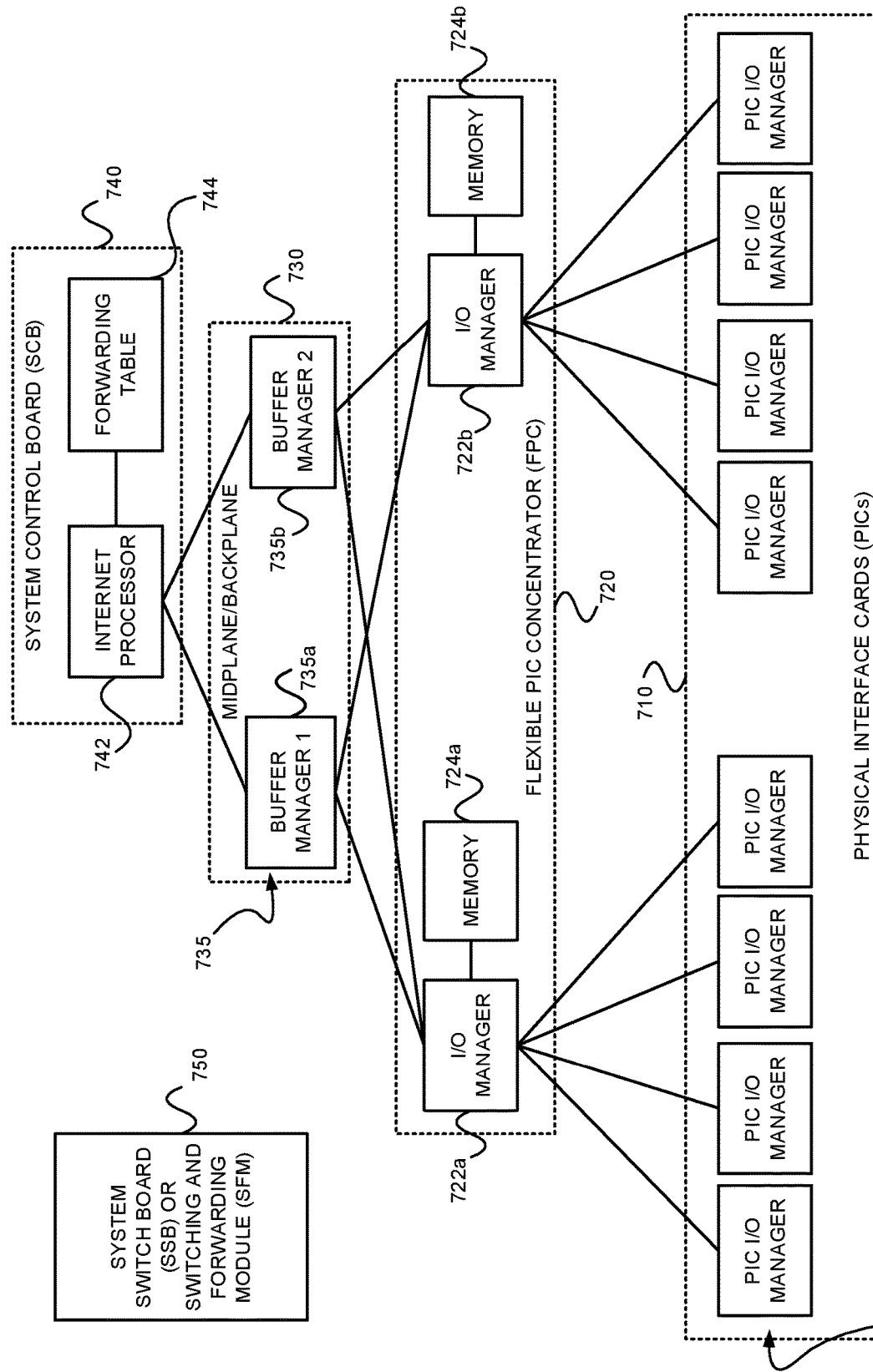
FIG. 7 is a block diagram of example distributed application specific integrated circuits ("ASICs") that may be provided in the example router of FIG. 6.

Referring back to distributed ASICs 694 of FIG. 6, FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an Internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Figure 8A:
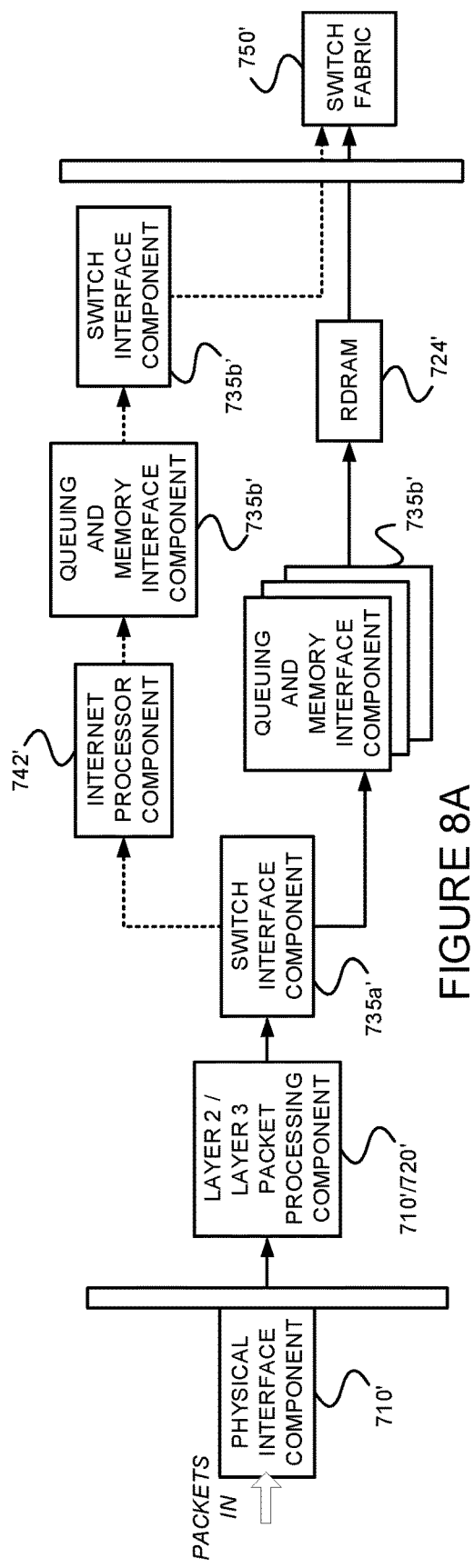
FIGS. 8A and 8B illustrate example packet forwarding operations of the example distributed ASICs of FIG. 7.
Figure 8B:
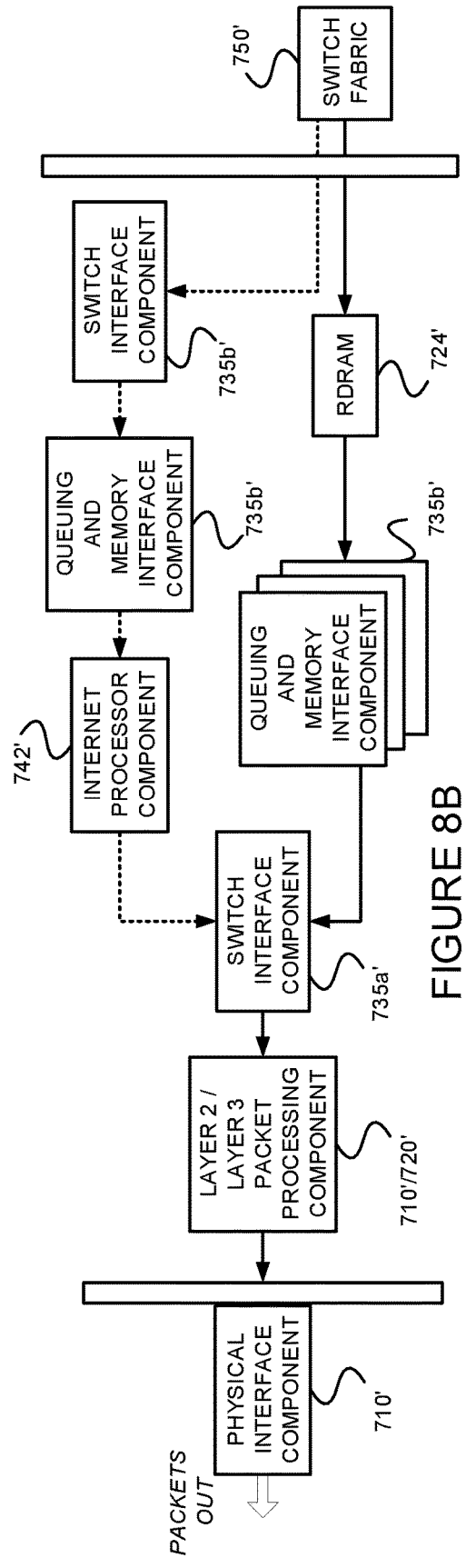

Referring to FIGS. 7, 8A and 8B, in some exemplary routers, each of the PICs 710,610' contains at least one I/O manager ASIC 715 responsible for media-specific tasks, such as encapsulation. The packets pass through these I/O ASICs on their way into and out of the router. The I/O manager ASIC 715 on the PIC 710,610' is responsible for managing the connection to the I/O manager ASIC 722 on the FPC 720,620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 64-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/642'. The Internet processor 742/642' performs the route lookup using the forwarding table 744 and sends the information over to a second DBM ASIC 735b'. The Internet processor ASIC 742/642' also collects exception packets (i.e., those without a forwarding table entry) and sends them to the control component 610. The second DBM ASIC 735b' then takes this information and the 64-byte blocks and forwards them to the I/O manager ASIC 722 of the egress FPC 720/620' (or multiple egress FPCs, in the case of multicast) for reassembly. (Thus, the DBM ASICs 735a' and 735b' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735b', incrementing TTL values, queuing a pointer to the packet, if necessary, before applying CoS rules, re-encapsulating the blocks, and sending the encapsulated packets to the PIC I/O manager ASIC 715.

Figure 9:
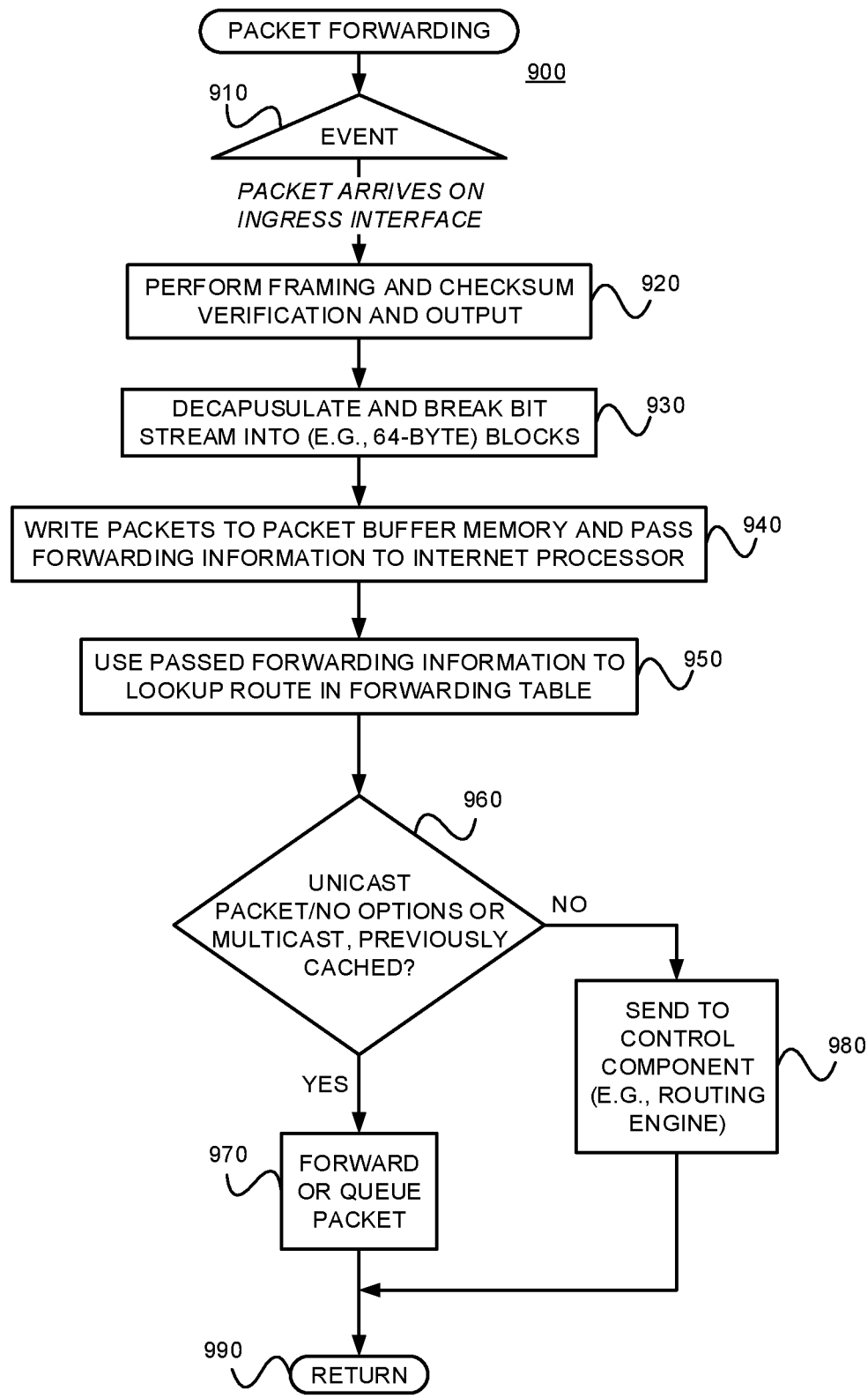
FIG. 9 is a flow diagram of an example packet forwarding method that may be implemented on any of the example routers of FIGS. 6 and 7.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) (Recall, e.g., FIGS. 7A-7D.) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735b. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present disclosure may be implemented on the example routers of FIG. 5 or 6, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 1000 as illustrated on FIG. 10.

Figure 10:
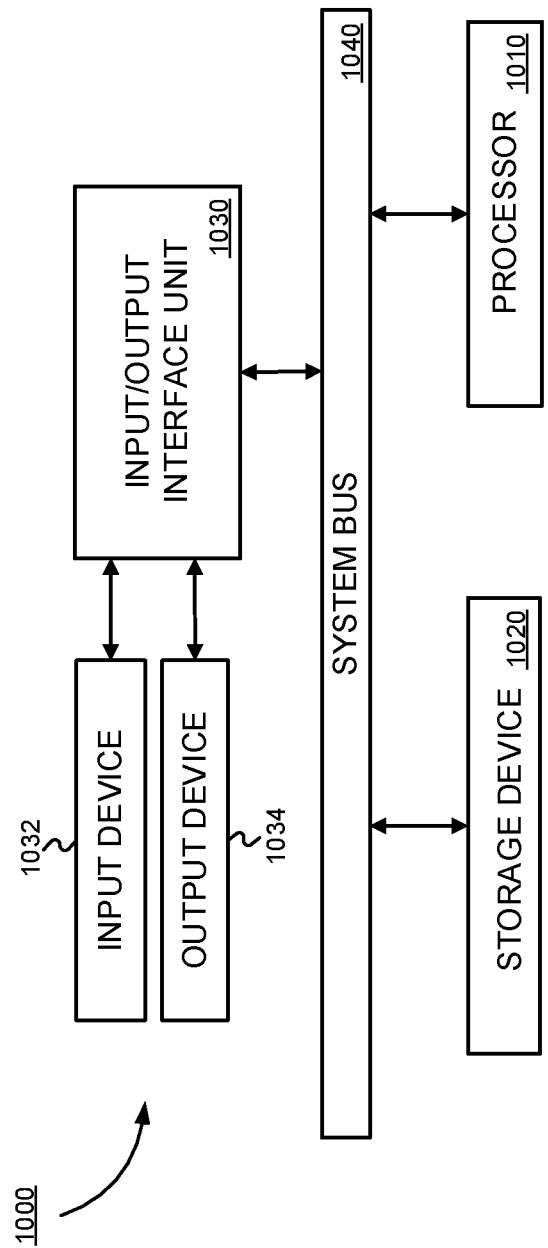
FIG. 10 is a block diagram of an example processor-based system that may be used to execute the example methods for processing an egress packet and/or to store information used and/or generated by such example methods.

FIG. 10 is a block diagram of an exemplary machine 1000 that may perform one or more of the methods described, and/or store information used and/or generated by such methods. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components, which may be used in the apparatus described.

In some embodiments consistent with the present disclosure, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 Conclusions

Example systems and methods consistent with the foregoing description permit routing table information to be split in a way that permits a longest best match to be found, and that avoids the disadvantages of the other proposed solutions (i.e., eliminates the need for a full-view table and reduces or eliminates the associated overhead). The scaling impact is limited to (number of protocol next hops)*(number of subsystems). A large number of next hop prefixes can be partitioned (e.g., 1 million next hop prefixes can be partitioned into four (4) mutually independent shards (e.g., each with approximately 250,000 next hops, though the number of next hops need not be evenly distributed among the shards). Although the subsystems can run asynchronously, the content of the local full-view trees of the subsystems will tend to converge.

What is claimed is:

1. A computer-implemented method for use in a system including a plurality of next hop resolution subsystems, each of the plurality of next hop resolution subsystems including (1) a next hop registry, (2) a partial-view tree storing a local instance of next hop resolution information, and (3) a full-view tree storing a local instance of next hop resolution information, the computer-implemented method comprising:
   a) receiving with one of the plurality of next hop resolution subsystems, a request to resolve a next hop;
   b) responsive to receiving the request, determining, using the next hop registry of the one next hop resolution subsystem, whether or not resolution of the next hop was previously tried;
   c) responsive to a determination that resolution of the next hop was previously tried,
      1) processing the next hop request using the full-view tree of the one next hop resolution subsystem to obtain a result including zero or more best match next hops, and
      2) replying to the request using the result, and otherwise, responsive to a determination that resolution of the next hop was not previously tried,
      1) processing the next hop request using partial-view tree of the one next hop resolution subsystem to obtain a result including zero or more best match next hops,
      2) updating the full-view tree of the one next hop resolution subsystem to include the result obtained,
      3) replying to the request using the result,
      4) publishing the next hop resolution request to the other of the plurality of next hop resolution subsystems, and
      5) publishing the result as an update to the other subsystems.

2. The computer-implemented method of claim 1 wherein, responsive to a determination that resolution of the next hop was not previously tried, further
   6) updating the next hop registry of the one next hop resolution subsystem to indicate that the next hop was previously tried.

3. The computer-implemented method of claim 2 further comprising:
   d) receiving, with the one subsystem, an update result from another one of the plurality of next hop resolution subsystems; and
   e) responsive to receiving the update result,
      1) updating the full-view tree of the one next hop resolution subsystem using the update result, whereby contents of each of the plurality full-view trees converge towards the same state, and
      2) updating the next hop registry on the one next hop resolution subsystem to indicate that a next hop associated with the update result was previously tried.

4. The computer-implemented method of claim 1 further comprising:
   d) receiving, with the one next hop resolution subsystem, an update result from another one of the plurality of next hop resolution subsystems; and
   e) responsive to receiving the update result, updating the full-view tree of the one next hop resolution subsystem using the update result, whereby contents of each of the plurality full-view trees converge towards the same state.

5. The computer-implemented method of claim 1, wherein each of the partial-view trees of the plurality of next hop resolution subsystems stores mutually exclusive next hop resolution information.

6. The computer-implemented method of claim 1 wherein the result is a next hop address having a longest match to the next hop.

7. The computer-implemented method of claim 1 wherein the result is a next hop that points to more than one next hop addresses.

8. The computer-implemented method of claim 1, wherein the act of processing the next hop request using partial-view tree of the one next hop resolution subsystem to obtain a result including zero or more best match next hops responsive to a determination that resolution of the next hop was not previously tried, includes
   obtaining a plurality of partial results using the partial-view trees of the next hop resolution subsystems, and
   selecting a best one of the plurality of partial results.

9. A system comprising:
   a plurality of next hop resolution subsystems, each of the plurality of next hop resolution subsystems including
      a) a next hop registry,
      b) a partial-view tree storing a local instance of next hop resolution information, c) a full-view tree storing a local instance of next hop resolution information, and
      d) a next hop resolution processor configured to:
         1) receive a request to resolve a next hop;
         2) responsive to receiving the request, determine, using the next hop registry of the next hop resolution subsystem, whether or not resolution of the next hop was previously tried;
         3) responsive to a determination that resolution of the next hop was previously tried, process the next hop request using the full-view tree of the next hop resolution subsystem to obtain a result including zero or more best match next hops, and reply to the request using the result, and otherwise, responsive to a determination that resolution of the next hop was not previously tried, process the next hop request using partial-view tree of the next hop resolution subsystem to obtain a result including zero or more best match next hops, update the full-view tree of its next hop resolution subsystem to include the result obtained, reply to the request using the result, publish the next hop resolution request to the other of the plurality of next hop resolution subsystems, and publish the result as an update to the other next hop resolution subsystems.

10. The system of claim 9 wherein, responsive to a determination that resolution of the next hop was not previously tried, the next hop resolution processor is further configured to update the next hop registry of the next hop resolution subsystem to indicate that the next hop was previously tried.

11. The system of claim 9 wherein the next hop resolution processor is further configured to
   4) receive an update result from another one of the plurality of next hop resolution subsystems; and
   5) responsive to receiving the update result,
      update the full-view tree of the next hop resolution subsystem using the update result, whereby contents of each of the plurality full-view trees converge towards the same state, and
      update the next hop registry of the next hop resolution subsystem to indicate that a next hop associated with the update result was previously tried.

12. The system of claim 9, wherein each of the partial-view trees of the plurality of next hop resolution subsystems stores mutually exclusive next hop resolution information.

13. The system of claim 9 wherein the result is a next hop address having a longest match to the next hop.

14. The system of claim 9 wherein the result is a next hop that points to more than one next hop address.

15. The system of claim 9 further comprising:
   a central request controller configured to
      1) issue requests to resolve a next hop to the subsystems, and
      2) manage results provided from the subsystems.

16. A non-transitory computer-readable medium storing processor executable code which, when executed by at least one processor, causes the at least one processor to perform a method for use in a system including a plurality of next hop resolution subsystems, each of the plurality of next hop resolution subsystems including (1) a next hop registry, (2) a partial-view tree storing a local instance of next hop resolution information, and (3) a full-view tree storing a local instance of next hop resolution information, the method comprising:
   a) receiving with one of the plurality of next hop resolution subsystems, a request to resolve a next hop;
   b) responsive to receiving the request, determining, using the next hop registry of the one next hop resolution subsystem, whether or not resolution of the next hop was previously tried;
   c) responsive to a determination that resolution of the next hop was previously tried,
      1) processing the next hop request using the full-view tree of the one next hop resolution subsystem to obtain a result including zero or one best match next hop address, and
      2) replying to the request using the result, and otherwise, responsive to a determination that resolution of the next hop was not previously tried,
      1) processing the next hop request using partial-view tree of the one next hop resolution subsystem to obtain a result including zero or one best match next hop address,
      2) updating the full-view tree of the one next hop resolution subsystem to include the result obtained,
      3) replying to the request using the result,
      4) publishing the next hop resolution request to the other of the plurality of next hop resolution subsystems, and
      5) publishing the result as an update to the other subsystems.

17. The non-transitory computer-readable medium of claim 16 wherein, responsive to a determination that resolution of the next hop was not previously tried, further
   6) updating the next hop registry of the one next hop resolution subsystem to indicate that the next hop was previously tried.

18. The non-transitory computer-readable medium of claim 17 further comprising:
   d) receiving, with the one subsystem, an update result from another one of the plurality of next hop resolution subsystems; and
   e) responsive to receiving the update result,
      1) updating the full-view tree of the one next hop resolution subsystem using the update result, whereby contents of each of the plurality full-view trees converge towards the same state, and
      2) updating the next hop registry on the one next hop resolution subsystem to indicate that a next hop associated with the update result was previously tried.

19. The non-transitory computer-readable medium of claim 16 further comprising:
   d) receiving, with the one next hop resolution subsystem, an update result from another one of the plurality of next hop resolution subsystems; and
   e) responsive to receiving the update result, updating the full-view tree of the one next hop resolution subsystem using the update result, whereby contents of each of the plurality full-view trees converge towards the same state.

20. The non-transitory computer-readable medium of claim 16, wherein each of the partial-view trees of the plurality of next hop resolution subsystems stores mutually exclusive next hop resolution information.

21. The non-transitory computer-readable medium of claim 20 wherein the best result selected is a longest match to the next hop.

22. The non-transitory computer-readable medium of claim 16 wherein, responsive to a determination that resolution of the next hop was not previously tried, after publishing the next hop resolution request to the other of the plurality of next hop resolution subsystems,
   waiting for a result from at least one of the plurality of next hop resolution subsystems, and
   selecting a best result from among a local result and the result from each of the at least one of the plurality of next hop resolution subsystems,
   wherein the reply to the request includes the best result.

23. The non-transitory computer-readable medium of claim 16 wherein the act of processing the next hop request using partial-view tree of the one next hop resolution subsystem to obtain a result including zero or more best match next hops responsive to a determination that resolution of the next hop was not previously tried, includes obtaining a plurality of partial results using the partial-view trees of the next hop resolution subsystems, and selecting a best one of the plurality of partial results.

* * * * *